(12) United States Patent
Ito et al.

(10) Patent No.: US 10,344,887 B2
(45) Date of Patent: Jul. 9, 2019

(54) ELECTROMAGNETIC ACTUATOR

(71) Applicant: CKD Corporation, Komaki-shi, Aichi (JP)

(72) Inventors: Akihiro Ito, Komaki (JP); Masayuki Kouketsu, Komaki (JP)

(73) Assignee: CKD Corporation, Komaki-shi (JP)

( * ) Notice: Subject to any disclaimer, the term of this patent is extended or adjusted under 35 U.S.C. 154(b) by 132 days.

(21) Appl. No.: 15/649,390

(22) Filed: Jul. 13, 2017

(65) Prior Publication Data

US 2018/0023723 A1 Jan. 25, 2018

(30) Foreign Application Priority Data

Jul. 25, 2016 (JP) .................................. 2016-145727

(51) Int. Cl.
*F16K 31/06* (2006.01)
*F16K 11/065* (2006.01)

(52) U.S. Cl.
CPC ...... *F16K 31/0693* (2013.01); *F16K 11/0655* (2013.01); *F16K 31/0617* (2013.01)

(58) Field of Classification Search
CPC ............. F16K 11/0655; F16K 31/0617; F16K 31/0693
USPC ....................................... 251/129.07, 129.15
See application file for complete search history.

(56) References Cited

U.S. PATENT DOCUMENTS

| 4,605,197 | A | * | 8/1986 | Casey | ................. | F15B 13/0438 |
| | | | | | | 137/625.61 |
| 4,635,683 | A | * | 1/1987 | Nielsen | .................... | H01F 7/13 |
| | | | | | | 137/625.65 |
| 4,664,136 | A | * | 5/1987 | Everett | .............. | G05D 16/2013 |
| | | | | | | 137/85 |
| 4,682,135 | A | * | 7/1987 | Yamakawa | ........... | H01F 7/1638 |
| | | | | | | 335/230 |
| 4,988,074 | A | * | 1/1991 | Najmolhoda | ......... | F16K 31/082 |
| | | | | | | 251/129.08 |
| 5,605,178 | A | * | 2/1997 | Jennins | ................. | F16K 31/082 |
| | | | | | | 137/625.65 |
| 6,182,942 | B1 | * | 2/2001 | Kadlicko | .............. | F15B 21/087 |
| | | | | | | 251/129.1 |

(Continued)

FOREIGN PATENT DOCUMENTS

| CN | 204141015 U | 2/2015 |
| JP | 2016-53407 | 4/1916 |

(Continued)

OTHER PUBLICATIONS

Korean Office Action dated Apr. 30, 2018 from Korean Application No. 10-2017-0091854.

(Continued)

*Primary Examiner* — Seth W. Mackay-Smith

(74) *Attorney, Agent, or Firm* — Beyer Law Group LLP

(57) ABSTRACT

An electromagnetic actuator includes a pair of plate springs each of which is configured to produce elastic force in a predetermined direction in accordance with an amount of deformation; a movable member supported by the pair of plate springs to be movable in the predetermined direction; and a drive unit which is configured to drive the movable member in the predetermined direction in a non-contact state by means of electromagnetic force to be applied between the pair of plate springs in the predetermined direction.

7 Claims, 13 Drawing Sheets

(56) References Cited

U.S. PATENT DOCUMENTS

| | | | | |
|---|---|---|---|---|
| 6,281,772 B1* | 8/2001 | Adams | .................... | H01F 7/081 |
| | | | | 251/129.16 |
| 2012/0323379 A1* | 12/2012 | Robertson, III | .... | F16K 31/0655 |
| | | | | 700/282 |

FOREIGN PATENT DOCUMENTS

| | | |
|---|---|---|
| JP | 62-060780 U | 4/1987 |
| JP | 10-196831 A | 7/1998 |
| JP | 2007-211857 A | 8/2007 |
| JP | 2008-259330 A | 10/2008 |
| WO | 2017/170939 | 10/1917 |

OTHER PUBLICATIONS

International Search Report from International Application No. PCT/JP2017/013413 dated May 30, 2017.
Chinese Office Action for Chinese Application No. 201710594480.2 dated Dec. 3, 2018.
Taiwanese Office Action for Taiwanese Application No. 10820068830 dated Jan. 22, 2019.
Taiwanese Office Action for Taiwanese Application No. 106118505 dated Jan. 22, 2019.

* cited by examiner

ELECTROMAGNETIC ACTUATOR

CROSS-REFERENCE TO RELATED APPLICATIONS

The present application claims priority based on Japan Patent Application No. 2016-145727 filed on Jul. 25, 2016, and the entire contents of that application are incorporated by reference in this specification.

BACKGROUND OF THE INVENTION

1. Field of the Invention

The present invention relates to an electromagnetic actuator which drives a movable member by means of electromagnetic force.

2. Description of the Related Art

An example of an electromagnetic actuator is a solenoid valve which moves a plunger fixed to a shaft (a movable member) by means of magnetic force generated by supplying current to a coil (see Japanese Patent Application Laid-Open (kokai) No. 2016-53407).

In the solenoid valve disclosed in Japanese Patent Application Laid-Open No. 2016-53407, the shaft is supported by two bearings such that the shaft can slide in the axial direction. Therefore, frictional force is generated between the shaft and the bearings, thereby lowering responsiveness in driving the shaft.

SUMMARY OF THE INVENTION

The present invention has been accomplished to solve the problem mentioned above, and an object of the present invention is to provide an electromagnetic actuator which can improve responsiveness in driving a movable member.

According to one aspect of the present invention, there is provided an electromagnetic actuator which comprises a pair of plate springs, a movable member, and a drive unit. Each of plate springs is configured to produce elastic force in a predetermined direction in accordance with an amount of deformation. The movable member supported by the pair of plate springs is movable in the predetermined direction. The drive unit is configured to drive the movable member in the predetermined direction in a non-contact state by means of electromagnetic force to be applied between the pair of plate springs in the predetermined direction.

According to the above-described configuration, the pair of plate springs is configured to apply elastic force to the movable member in the predetermined direction in accordance with the amount of deformation of the plate springs. Since the movable member is supported by the pair of plate springs to be movable in the predetermined direction, the movable member can be movably supported without involving sliding movement. The movable member is configured to be driven in the predetermined direction in a non-contact state by means of electromagnetic force to be applied by the drive unit. As a result, no frictional force is generated during the drive of the movable member, whereby responsiveness in driving the movable member can be improved.

Further, the movable member is supported by the pair of plate springs, and electromagnetic force is configured to be applied between the pair of plate springs in the predetermined direction. Therefore, it is possible to prevent swaying of the movable member when the movable member is driven.

The above and other objects, features, and advantages of the present invention will be apparent from the following description when taken in conjunction with the accompanying drawings which illustrate preferred embodiments of the present invention by way of example.

DETAILED DESCRIPTION OF EMBODIMENTS OF THE INVENTION

An embodiment will be explained below with reference to the drawings. The present embodiment is applied to a flow passage changeover valve for changeover between a flow passage for supplying air to a load (volume) and a flow passage for discharging air from the load.

Figure 1:
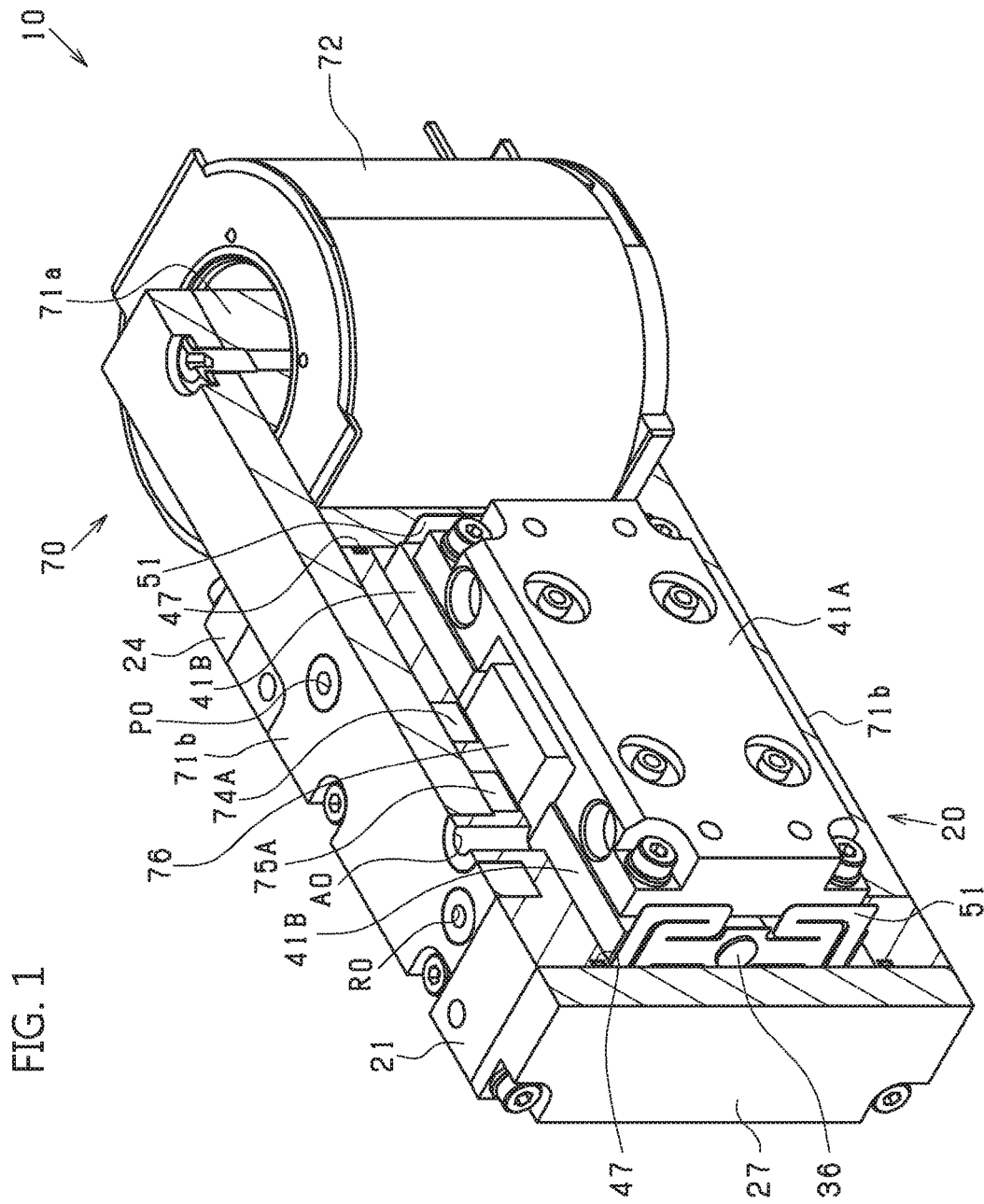
FIG. 1 is a perspective sectional view of a flow passage changeover valve according to an embodiment.
Figure 2:
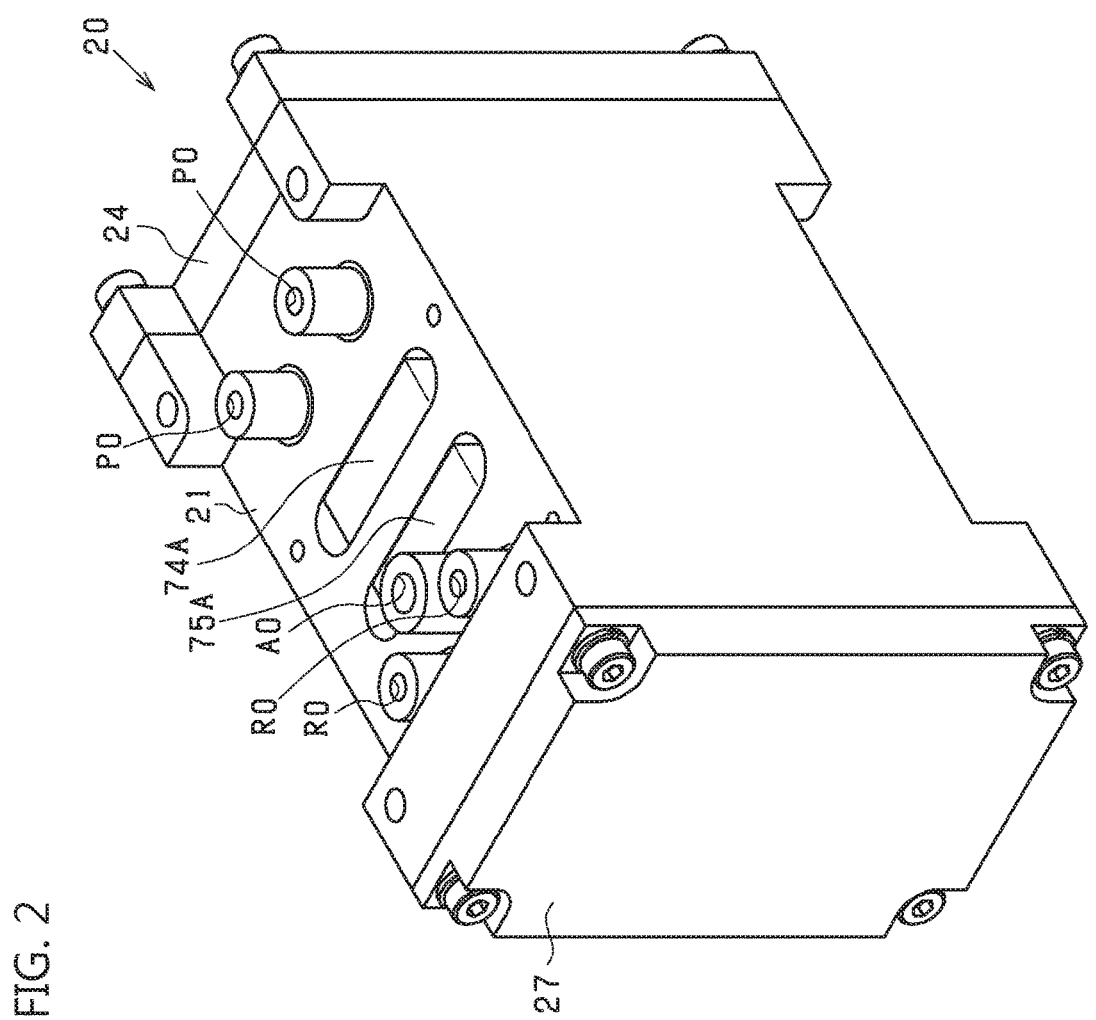
FIG. 2 is a perspective view showing ports of a valve mechanism and a portion therearound.
Figure 3:
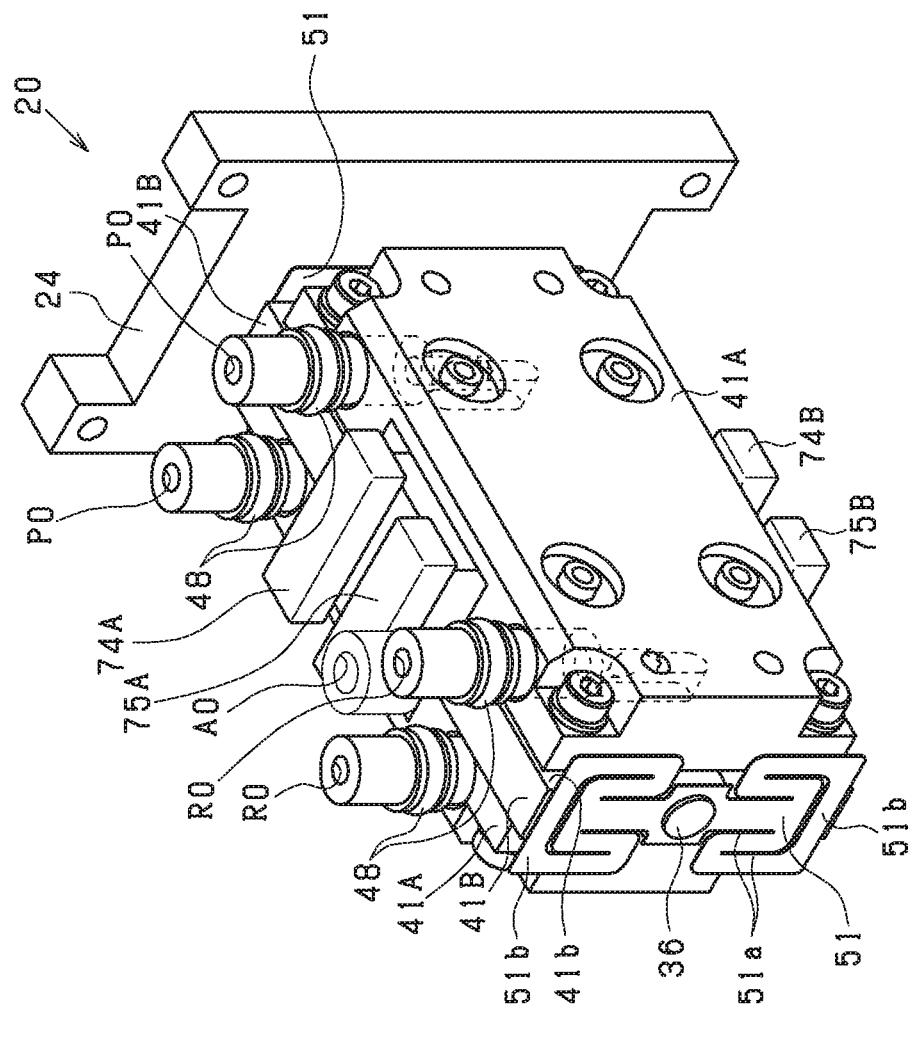
FIG. 3 is a perspective view showing the ports, main bodies, plate springs, magnets, etc.

As shown in FIGS. 1 to 3, the flow passage changeover valve 10 (the electromagnetic actuator) includes a valve mechanism 20 and a drive unit 70. The valve mechanism 20 and the drive unit 70 are connected to each other through a connection member 24. The drive unit 70 drives a valve body 31 (see FIG. 4) of the valve mechanism 20.

Figure 5:
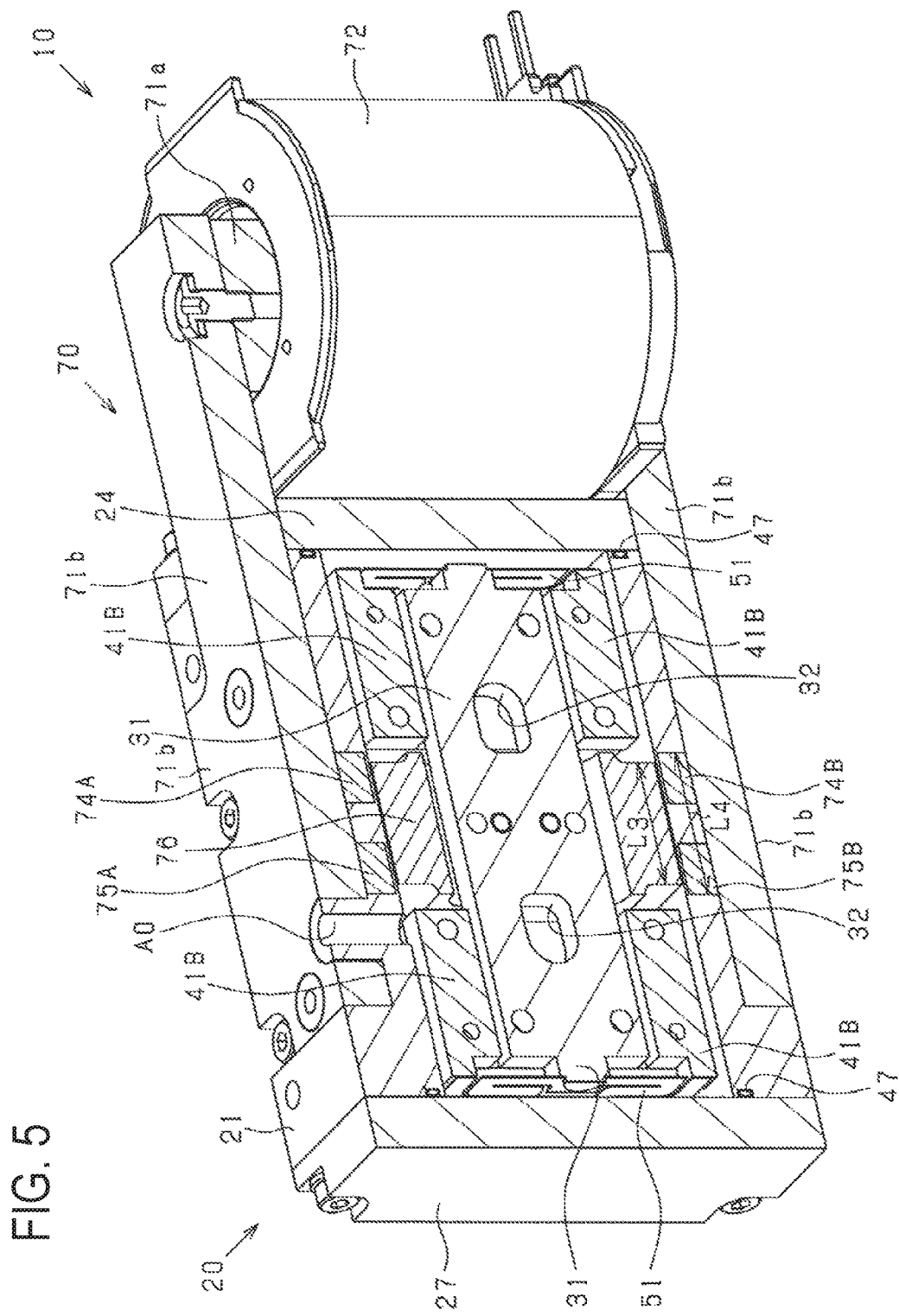
FIG. 5 is a perspective sectional view of the flow passage changeover valve.

As shown in FIGS. 3 and 5, the valve mechanism 20 includes a housing 21, the valve body 31, a pair of first main bodies 41A, a pair of second main bodies 41B, a pair of plate springs 51, a cover 27, etc. The housing 21, the valve body 31, the first main bodies 41A, the second main bodies 41B, the plate springs 51, and the cover 27 are made of a non-magnetic material.

FIG. 2 shows the flow passage changeover valve 10 of FIG. 1, with the drive unit 70, excluding magnets 74A and 75A, removed therefrom. As shown in FIG. 2, the housing 21 has a rectangular tubular shape. The housing 21 has P0 ports (pressurized air ports) to which pressurized air (the fluid) is supplied, an A0 port (output port) from which air is supplied to the load and to which air is discharged from the load, and R0 ports (discharge port) from which air is discharged. The P0 ports, the A0 port, and the R0 ports are made of a non-magnetic material. Pressurized-air supply flow passages, an output flow passage, and air discharge flow passages are connected to the P0 ports, the A0 port, and the R0 ports, respectively. As shown in FIG. 3, the pressurized-air supply flow passages and the air discharge flow passages are connected to the first main bodies 41A. The output flow passage has an opening on the inner wall surface of the housing 21.

Figure 4:
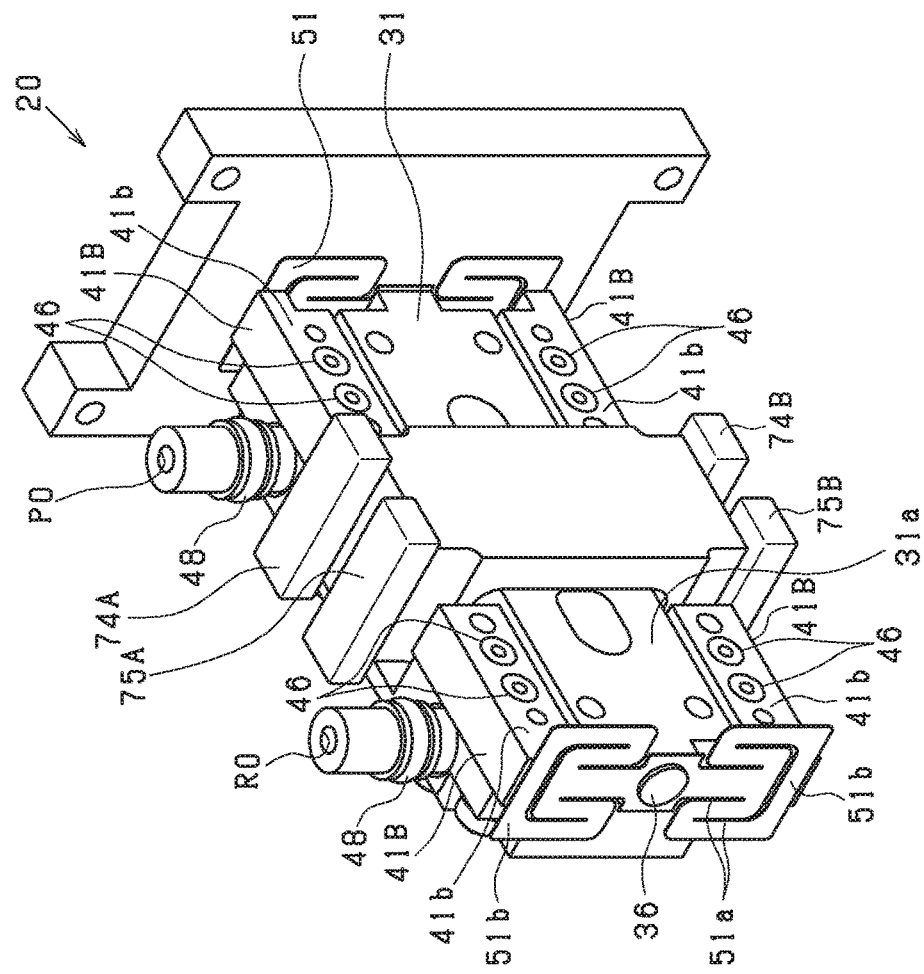
FIG. 4 is a perspective view corresponding to FIG. 3 and showing a state in which the ports and the first main body on one side are removed.

FIG. 3 shows the valve mechanism 20 of FIG. 2, with the housing 21 and the cover 27 removed therefrom. FIG. 4 shows the valve mechanism 20 of FIG. 3, with the A0 port removed therefrom and the P0 port, the R0 port, and the first main body 41A on one side removed therefrom. The valve body 31, the main bodies 41A and 41B, the plate springs 51, the magnets 74A, 74B, 75A, and 75B, etc. are provided inside the housing 21. Each of the main bodies 41A and 41B has the shape of a rectangular parallelepiped (the shape of a flat plate). The first main bodies 41A are fixed to the housing 21. The second main bodies 41B are fixed to the first main bodies 41A. The valve body 31 has the shape of a rectangular parallelepiped (the shape of a flat plate).

The valve body 31 is provided between the second main bodies 41B provided in parallel. A gap is formed between each of the second main bodies 41B and the valve body 31. Namely, the valve body 31 does not contact with the second main bodies 41B.

The valve body 31 is fixed to the second main bodies 41B through the plate springs 51. Specifically, the plate springs 51 are respectively attached to opposite ends 36 of the valve body 31, which are located on the opposite sides in the longitudinal direction thereof. The longitudinal direction of the valve body 31 (the predetermined direction) is a direction in which the plate springs 51 elastically deform. Each of the plate springs 51 is made of a spring material such as spring steel and has the shape of a rectangular plate. Each plate spring 51 has slits 51a formed at predetermined positions. As a result of formation of the slits 51a in the plate springs 51, the plate springs 51 each have a predetermined meandering pattern. The thickness of the plate springs 51 is determined such that each of the plate springs 51 has a predetermined rigidity and generates a predetermined elastic force. Two short-side portions 51b of each plate spring 51 are fixed to the corresponding second main bodies 41B. Each plate spring 51 is fixed to the corresponding second main bodies 41B such that its main faces (vertical surfaces in FIGS. 3 and 4) having the largest area extend perpendicularly to the longitudinal direction of the valve body 31. By virtue of such a configuration, the valve body 31 (the movable member) is supported by the pair of plate springs 51 to be movable in the longitudinal direction of the valve body 31.

Figure 6:
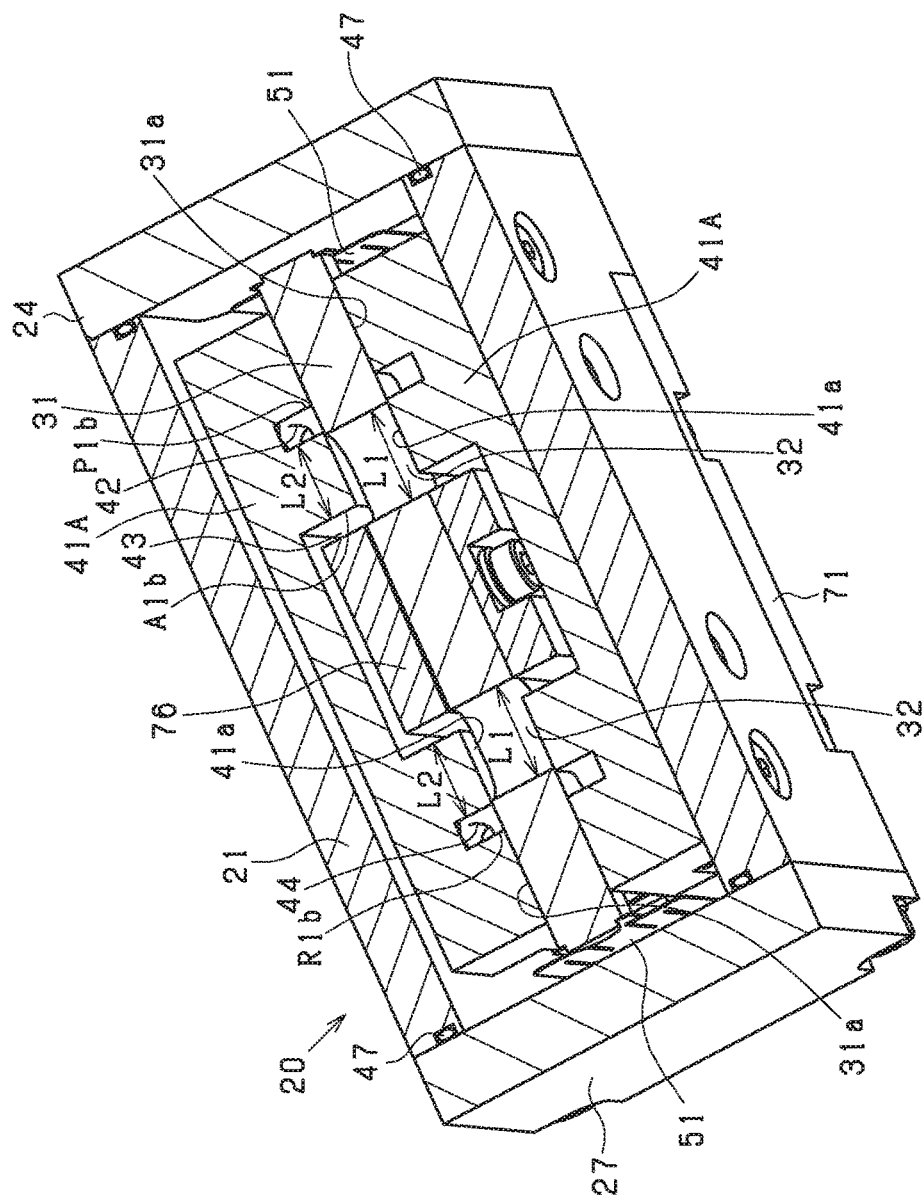
FIG. 6 is a perspective sectional view of the valve mechanism.

Predetermined surfaces 31a of the valve body 31 are flush with corresponding first surfaces 41b of the second main bodies 41B. As shown in FIG. 6, facing surfaces 41a of the first main bodies 41A face the predetermined surfaces 31a of the valve body 31. The first surfaces 41b of the second main bodies 41B face the facing surfaces 41a of the first main bodies 41A. The first main bodies 41A and the second main bodies 41B are fixed together in a state in which two shims (spacers) 46 having a predetermined thickness and arranged side by side are inserted between each of the first surfaces 41b of the second main bodies 41B and corresponding one of the facing surfaces 41a of the first main bodies 41A. The thickness of the shims 46 is about 10 μm. Namely, gaps (predetermined gaps) corresponding to the thickness of the shims 46 are formed between the predetermined surfaces 31a of the valve body 31 and the facing surfaces 41a of the first main bodies 41A. Therefore, the valve body 31 has no portion which is in sliding engagement with other members. Notably, the number of the shims 46 is not limited to two, and may be one or three or more.

As shown in FIG. 6, the valve body 31 has two open flow passages 32 which are open to the predetermined surfaces 31a over a predetermined length L1 as measured in the longitudinal direction of the valve body 31 (the predetermined direction). The open flow passage 32 penetrate the valve body 31 in a direction orthogonal to the predetermined surfaces 31a and each have the shape of an oval hole whose length along the major axis is the predetermined length L1. Notably, there can be employed a configuration in which the open flow passages 32 are recesses formed on the predetermined surfaces 31a of the valve body 31 and do not penetrate the valve body 31.

Each of the first main bodies 41A has a P1b port, an A1b port, and an R1b port (the plurality of ports) which are open to the facing surface 41a. The P1b port, the A1b port, and the R1b port are formed at intervals L2 in the longitudinal direction of the valve body 31. The intervals L2 are shorter than the predetermined length L1. Each of the first main bodies 41A has connection flow passages 42, 43, and 44 which are connected to the P1b port, the A1b port, and the R1b port, respectively. The connection flow passages 42, 43, and 44 are connected to the above-described pressurized-air supply flow passage, output flow passage, and air discharge flow passage, respectively. Notably, the connection flow passage 43 is connected to the output flow passage through a space inside the housing 21. The space inside the housing 21 is sealed by seal members 47 and seal members 48 (see FIG. 3).

The predetermined surfaces 31a of the valve body 31 and the facing surfaces 41a of the main bodies 41 are finished to have a predetermined degree of flatness. Also, as shown in FIG. 4, the plate springs 51 support the valve body 31 such that the predetermined surfaces 31a and the facing surfaces 41a have a predetermined degree of parallelism therebetween. Specifically, the opposite longitudinal ends 36 of the valve body 31 penetrate the centers of the plate springs 51 and are fixed thereto.

The plate springs 51 apply elastic force to the valve body 31 in accordance with the amount of movement of the valve body 31 in the longitudinal direction of the valve body 31 (a direction orthogonal to the main faces of the plate springs 51). Specifically, the plate springs 51 apply to the valve body 31 an elastic force which is proportional to the amount of movement of the valve body 31 in the longitudinal direction of the valve body 31; i.e., the amounts of deformation of the plate springs 51.

Next, the structure of the drive unit 70 will be described with reference to FIGS. 1 and 5. The drive unit 70 includes a core 71 (71a, 71b), a coil 72, the magnets 74A, 74B, 75A, and 75B, etc.

The core 71 is made of a paramagnetic material and has a "U" like shape. The coil 72 is wound around a portion 71a of the core 71, which portion 71a corresponds the bottom of the letter U. A pair of straight portions 71b of the core 71, which portions 71b correspond to the pair of straight portions of the letter U, are parallel to each other.

The magnets 74A and 75A are attached to one of the two straight portions 71b which is located on the upper side. The magnets 74B and 75B are attached to the other of the two straight portions 71b which is located on the lower side. Each of the magnets 74A to 75B has the shape of a rectangular parallelepiped. The magnets 74A and 75B are attached to the straight portions 71b of the core 71 such that their S poles are located on the side toward the straight portions 71b of the core 71 and their N poles are located on the side toward the valve body 31 (the movable element 76). The magnets 74B and 75A are attached to the straight portions 71b of the core 71 such that their N poles are located on the side toward the straight portions 71b of the core 71 and their S poles are located on the side toward the valve body 31 (the movable element 76). The N pole of the magnet 74A and the S pole of the magnet 74B face each other, and the S pole of the magnet 75A and the N pole of the magnet 75B face each other. The surfaces of the magnets 74A and 74B which face each other are parallel to each other, and the surfaces of the magnets 75A and 75B which face each other are parallel to each other. The magnets 74A and 75A are provided at a predetermined interval in the longitudinal direction of the valve body 31 (the predetermined direction), and the magnets 74B and 75B are provided at the predetermined interval in the predetermined direction.

The movable element 76 is provided between the magnets 74A and 75A and the magnets 74B and 75B with portions of the housing 21 intervening therebetween. The portions of the housing 21 intervening between the magnet 74A and 74B and the portions of the housing 21 intervening between the magnets 75A and 75B are formed to be thin so that magnetic fluxes easily pass through these portions. The movable element 76 is formed of a paramagnetic material and has a rectangular tubular shape. The width L3 of the movable element 76 as measured in the predetermined direction is smaller than the spacing L4 between the end surface of the magnet 74B (74A) on the connection member 24 side and the end surface of the magnet 75B (75A) on the cover 27 side. The valve body 31 extends through a hollow space of the movable element 76. The movable element 76 is fixed to the center of the valve body 31 in the predetermined direction. Namely, the movable element 76 is fixed to a portion of the valve body 31, which portion is located between the pair of plate springs 51. The movable element 76 does not contact with members other than the valve body 31.

In the predetermined direction, the movable element 76 is located at the center position (neutral position) between the magnet 74A (74B) and the magnet 75A (75B) due to magnetic forces of the magnets 74A, 74B, 75A, and 75B. In this state, the movable element 76 is fixed to the valve body 31 supported by the pair of plate springs 51 in the natural state. Namely, in the drive unit 70, the position of the movable element 76 in a state in which the plate springs 51 support the valve body 31 in the natural state is used as (corresponds to) a neutral position at which the movable element 76 is located when electromagnetic force for reciprocating the valve body 31 (the movable element 76) in the predetermined direction is not applied to the movable element 76. The drive unit 70 drives the valve body 31 in the predetermined direction in a non-contact state by means of the electromagnetic force applied to the movable element 76 at a position between the pair of plate springs 51 in the predetermined direction.

Next, the principle of reciprocating the valve body 31 in the longitudinal direction of the valve body 31 (the predetermined direction) by the drive unit 70 will be described with reference to FIGS. 7 to 9.

Figure 7:
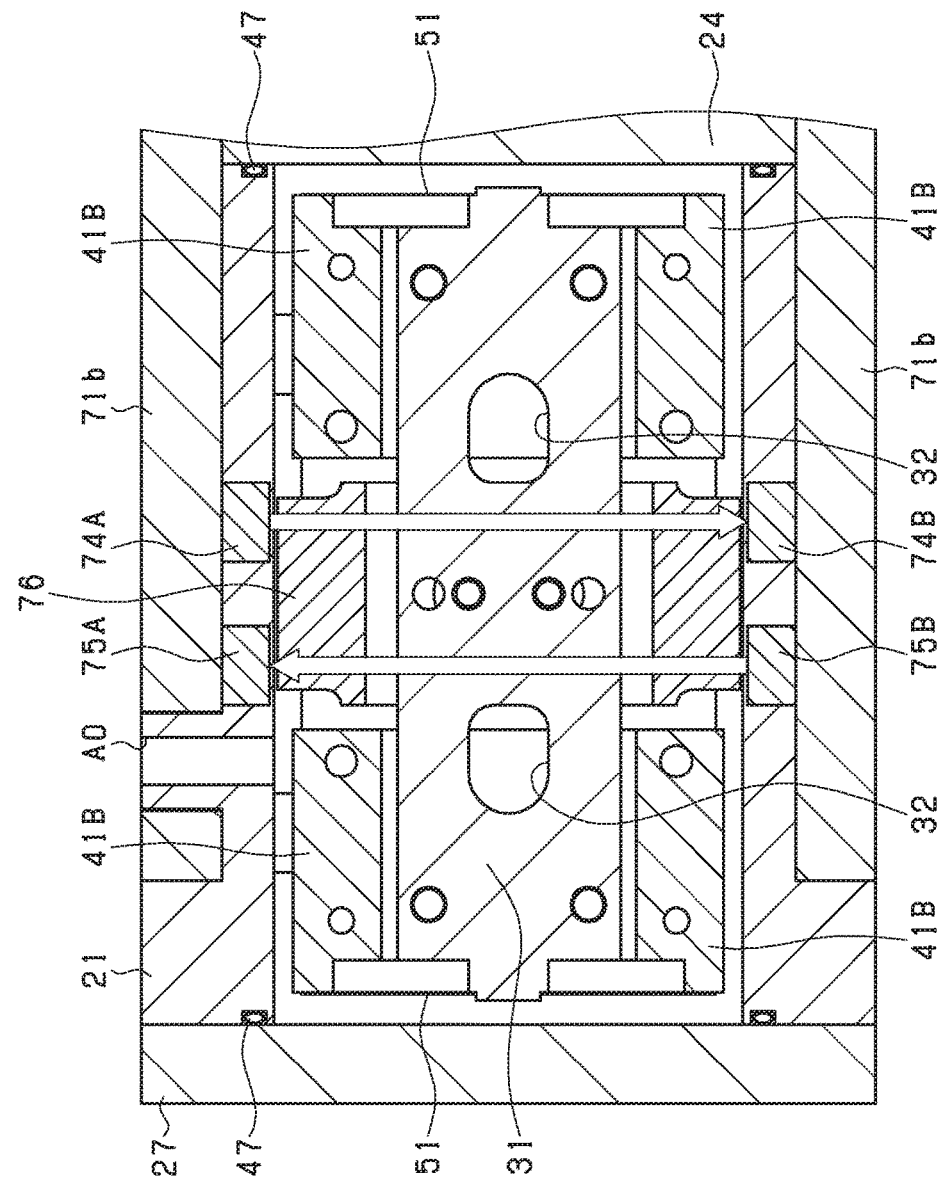
FIG. 7 is a front sectional view of the valve mechanism in a state in which the valve mechanism is not magnetically excited.

In a state in which the valve mechanism 20 is not magnetically excited; i.e., a state in which no current is supplied to the coil 72 of the drive unit 70, as shown in FIG. 7, a magnetic field extending from the N pole of the magnet 74A toward the S pole of the magnet 74B and a magnetic field extending from the N pole of the magnet 75B toward the S pole of the magnet 75A are generated. In this state, the movable element 76 is at rest in the neutral position in the predetermined direction because the generated magnetic fields are in balance. In this state, since the pair of plate springs 51 are in the natural state, no force is applied from the pair of plate springs 51 to the valve body 31. Also, in this state, the P1b port and the R1b port of each first main body 41A are closed by the valve body 31 as shown in FIG. 6.

Figure 8:
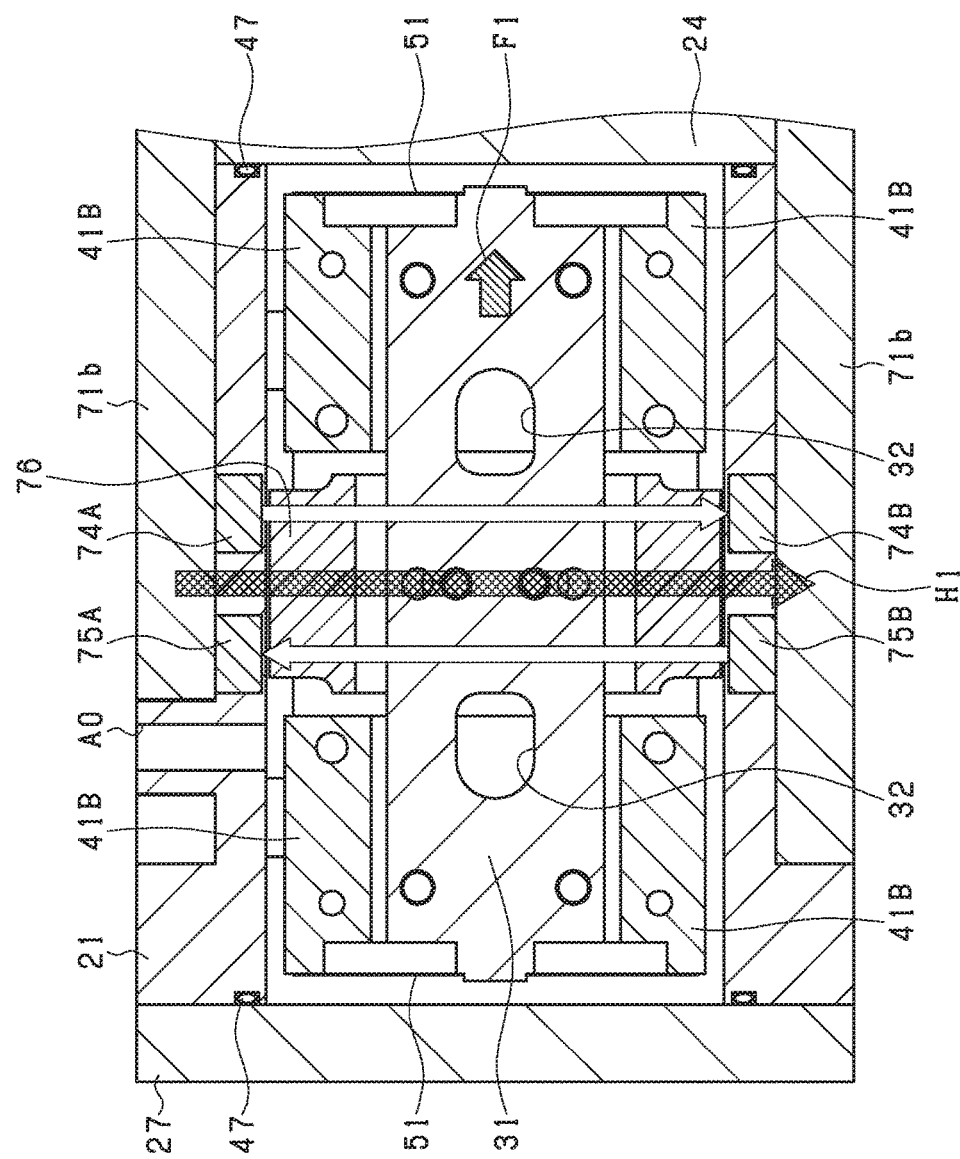
FIG. 8 is a front sectional view of the valve mechanism in a state in which the valve mechanism is magnetically excited in a positive direction.

In a state in which the valve mechanism 20 is magnetically excited in a positive direction; i.e., in a state in which a current of a positive direction is supplied to the coil 72 of the drive unit 70, a coil magnetic field extending from the upper straight portion 71b of the core 71 toward the lower straight portion 71b of the core 71 is generated as indicated by an arrow H1 in FIG. 8. Therefore, the magnetic field extending from the N pole of the magnet 74A toward the S pole of the magnet 74B and the coil magnetic field strengthen each other, and the magnetic field extending from the N pole of the magnet 75B toward the S pole of the magnet 75A and the coil magnetic field weaken each other. As a result, the movable element 76 receives a magnetic attraction force toward the connection member 24. Thus, the valve body 31 moves, together with the movable element 76, in the direction indicated by an arrow F1. At that time, by means of electromagnetic force, the drive unit 70 drives the valve body 31 in a non-contact state, whereby the valve body 31 is driven without coming into contact with the main bodies 41A and 41B. When the valve body 31 is driven, the pair of plate springs 51 apply to the valve body 31 a reaction force (elastic force) which is proportional to the amount of movement of the valve body 31. In FIG. 6, when the valve body 31 is moved toward the connection member 24, the A1b port and the P1b port of each first main body 41A are connected through the open flow passage 32 of the valve body 31. Namely, the flow passage of the flow passage changeover valve 10 is switched.

The same pressurized air is supplied to the P1b ports of the two first main bodies 41A provided on opposite sides of the valve body 31. As a result, the pressure produced by the air flowing toward the valve body 31 from the P1b port of the first main body 41A provided on the one side and the pressure produced by the air flowing toward the valve body 31 from the P1b port of the first main body 41A provided on the other side are cancelled out.

Figure 9:
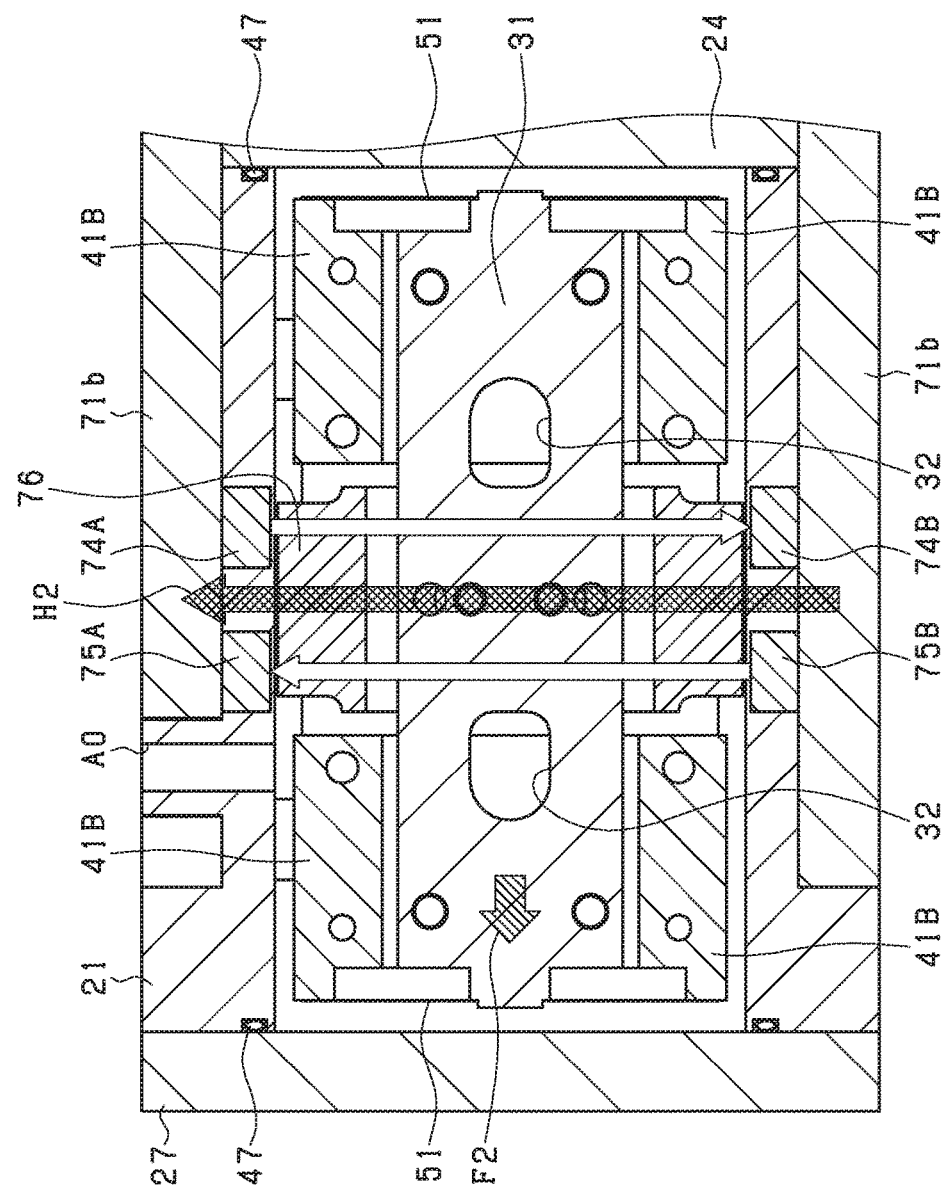
FIG. 9 is a front sectional view of the valve mechanism in a state in which the valve mechanism is magnetically excited in a negative direction.

In a state in which the valve mechanism 20 is magnetically excited in a negative direction; i.e., in a state in which a current of a negative direction is supplied to the coil 72 of the drive unit 70, a coil magnetic field extending from the lower straight portion 71b of the core 71 toward the upper straight portion 71b of the core 71 is generated as indicated by an arrow H2 in FIG. 9. Therefore, the magnetic field extending from the N pole of the magnet 74A toward the S pole of the magnet 74B and the coil magnetic field weaken each other, and the magnetic field extending from the N pole of the magnet 75B toward the S pole of the magnet 75A and the coil magnetic field strengthen each other. As a result, the movable element 76 receives a magnetic attraction force toward the cover 27. Thus, the valve body 31 moves, together with the movable element 76, in the direction indicated by an arrow F2. At that time, by means of electromagnetic force, the drive unit 70 drives the valve body 31 in a non-contact state, whereby the valve body 31 is driven without coming into contact with the main bodies 41A and 41B. When the valve body 31 is driven, the pair of plate springs 51 apply to the valve body 31 a reaction force which is proportional to the amount of movement of the valve body 31. In FIG. 6, when the valve body 31 is moved toward the cover 27, the A1b port and the R1b port of each first main body 41A are connected through the open flow passage 32 of the valve body 31. Namely, the flow passage of the flow passage changeover valve 10 is switched.

The present embodiment having been described in detail above has the following advantages.

The pair of plate springs 51 apply elastic force to the valve body 31 in the predetermined direction in accordance with the amount of deformation of the plate springs 51. Since the valve body 31 is supported by the pair of plate springs 51 to be movable in the predetermined direction, the valve body 31 can be movably supported without involving sliding movement. The valve body 31 is driven in the predetermined direction in a non-contact state by means of electromagnetic force applied by the drive unit 70. As a result, no frictional force is generated during the drive of the valve body 31, whereby responsiveness in driving the valve body 31 can be improved. Further, since the valve body 31 is driven without involving sliding movement, the valve body 31 is free of wear, and can be used semi-permanently compared to the case of an ordinary valve body involving sliding movement.

The valve body 31 is supported by the pair of plate springs 51, and electromagnetic force is applied between the pair of plate springs 51 in the predetermined direction. Therefore, it is possible to prevent swaying of the valve body 31 when the valve body 31 is driven.

Electromagnetic force is applied to the movable element 76 fixed to the valve body 31. Therefore, the valve body 31 can be designed separately from the movable element 76 to which electromagnetic force is applied, whereby the degree of freedom in designing the valve body 31 can be increased.

Fluid can be caused to flow, through the connection flow passages formed in the first main bodies 41A, to or from the ports connected to the connection flow passages. The valve body 31 has the open flow passages 32 which are open to the predetermined surfaces 31a over the predetermined length L1 in the predetermined direction. Each of the first main bodies 41A has a plurality of ports which are formed at the interval L2 shorter than the predetermined length L1 in the predetermined direction such that the ports are open to the facing surfaces 41a of the first main bodies 41A which face the predetermined surfaces 31a of the valve body 31. Therefore, by driving the valve body 31 in the predetermined direction by the drive unit 70, the state of connection of the plurality of ports through the open flow passages 32 of the valve body 31; i.e., the flow passage for the fluid, can be switched.

The predetermined surfaces 31a of the valve body 31 are flush with the corresponding first surfaces 41b of the second main bodies 41B, and the first main bodies 41A and the second main bodies 41B are fixed together in a state in which the shims 46 each having a predetermined thickness are provided between the facing surfaces 41a of the first main bodies 41A and the first surfaces 41b of the second main bodies 41B. Therefore, gaps corresponding to the thickness of the shims 46 can be easily formed between the predetermined surfaces 31a of the valve body 31 and the facing surfaces 41a of the first main bodies 41A.

The plate springs 51 are fixed to the second main bodies 41B such that the main faces of the plate springs 51 having the largest area extend perpendicularly to the predetermined direction. Therefore, the plate springs 51 can easily realize a structure in which the plate springs 51 support the valve body 31, while maintaining the gaps between the predetermined surfaces 31a of the valve body 31 and the facing surfaces 41a of the first main body 41A, and apply to the valve body 31 only elastic force along the predetermined direction.

Since the opposite ends 36 of the valve body 31 are supported by the pair of plate springs 51, it becomes easier to stably support the valve body 31.

In the drive unit 70, the position of the valve body 31 (the movable element 76) in a state in which the plate springs 51 support the valve body 31 in the natural state is used as (corresponds to) the neutral position at which the valve body 31 (the movable element 76) is located when electromagnetic force for reciprocating the valve body 31 (the movable element 76) in the predetermined direction is not applied to the movable element 76. By virtue of this configuration, the valve body 31 can be maintained at the neutral position in the predetermined direction in a state in which the plate springs 51 support the valve body 31 in the natural state and no electromagnetic force is applied to the movable element 76 by the drive unit 70. Therefore, by controlling the electromagnetic force applied to the movable element 76 while using the neutral position as a reference, the valve body 31 can be easily reciprocated with excellent reproducibility. Further, the flow rate of the fluid in a state in which no electromagnetic force is applied to the movable element 76 by the drive unit 70 can be stabilized at a constant level.

The predetermined surfaces 31a of the valve body 31 and the facing surfaces 41a of the first main bodies 41A are finished to have a predetermined degree of flatness. The plate springs 51 support the valve body 31 such that the predetermined surfaces 31a and the facing surfaces 41a have a predetermined degree of parallelism therebetween. According to such a configuration, the degrees of flatness and parallelism of the predetermined surfaces 31a of the valve body 31 and the facing surfaces 41a of the main bodies 41 are controlled. Therefore, it is possible to increase the accuracy of the predetermined gaps formed between the predetermined surfaces 31a and the facing surfaces 41a.

Since the predetermined gaps are formed between the predetermined surfaces 31a of the valve body 31 and the facing surfaces 41a of the main bodies 41, even in a state in which the P1b ports are not connected to the corresponding open flow passage 32, air flowing from the P1b ports toward the valve body 31 leaks through the predetermined gaps. Since the size of the predetermined gaps is about 10 μm, the amount of air leaking through the predetermined gaps can be decreased.

The pair of first main bodies 41 are provided on the opposite sides of the valve body 31. Each of the first main bodies 41A has a plurality of ports; i.e., the P1b port, the A1b port, and the R1b port. Therefore, by causing the same air to flow through the P1b, A1b, and R1b ports of one first main body 41A and flow through the P1b, A1b, and R1b ports of the other first main body 41A, it is possible to cancel out the pressure generated by the air flowing toward the valve body 31 from the P1b and A1b ports of the one first main body 41A and the pressure generated by the air flowing toward the valve body 31 from the P1b and A1b ports of the other first main body 41A. Accordingly, it is possible to prevent the valve body 31 from displacing in a direction away from the P1b and A1b ports due to the pressure of air flowing toward the valve body 31 from the P1b and A1b ports. Also, the required rigidity of the plate spring 51 can be decreased, and thinner plate springs 51 can be employed.

Notably, the above-described embodiment may be modified as follows.

There can be employed a structure in which the pair of plate springs 51 support portions of the valve body 31 other than the opposite ends 36; for example, portions of the valve body 31 slightly offset from the opposite ends toward the center of the valve body 31.

The thickness of the shims 46 is not limited to about 10 μm, and may be 5 to 10 μm, 10 to 15 μm, or 15 to 20 μm.

In the drive unit 70, the position of the valve body 31 (the movable element 76) at which the plate springs 51 support the valve body 31 in the natural state may differ from the neutral position at which the valve body 31 (the movable element 76) is located when electromagnetic force for reciprocating the valve body 31 in the longitudinal direction is not applied to the movable element 76.

There can be employed a structure in which the plate springs 51 attached to the opposite ends 36 of the valve body 31 produce different elastic forces.

There can be employed a structure in which the plate springs 51 are fixed to the main bodies 41 such that their main faces having the largest area extend obliquely, rather than perpendicularly, with respect to the longitudinal direction of the valve body 31.

Figure 10:
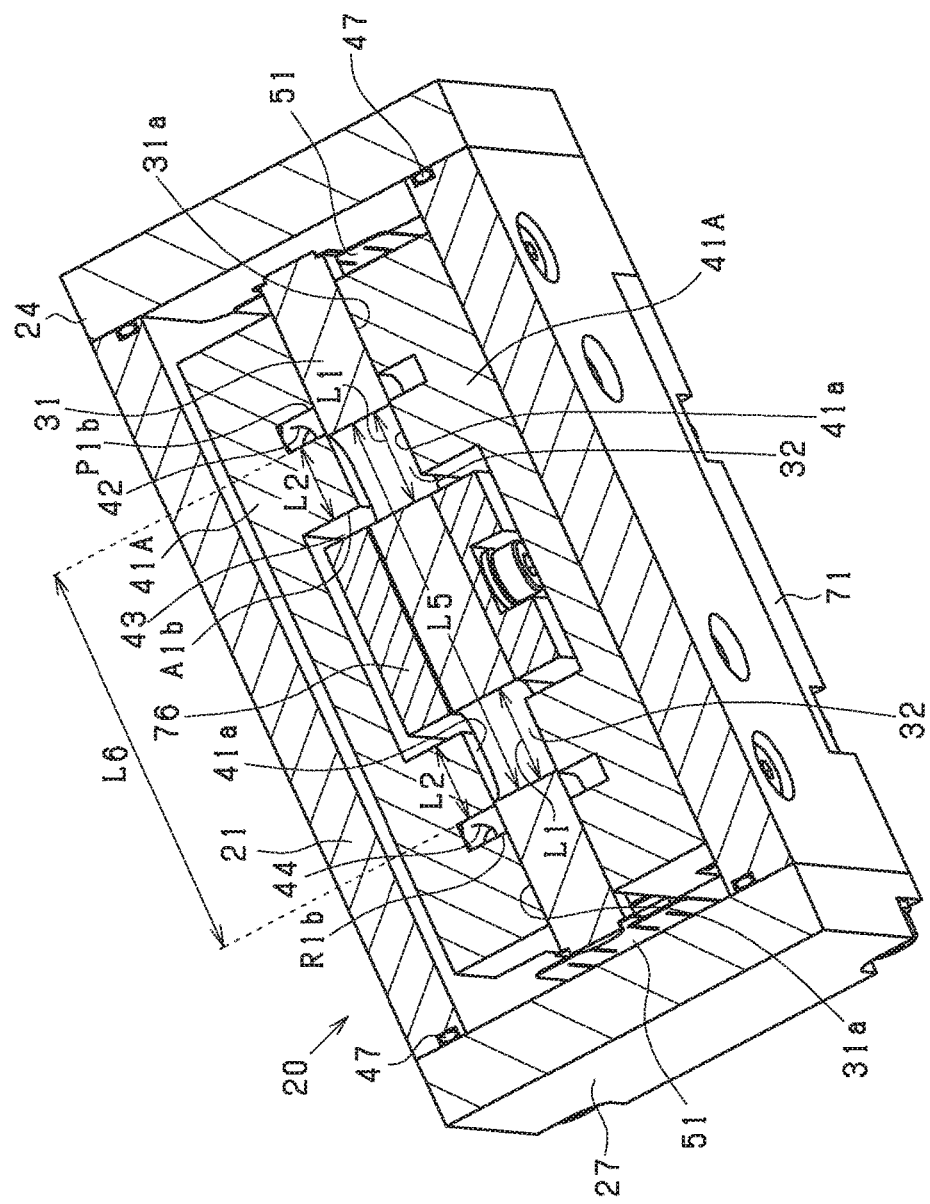
FIG. 10 is a perspective sectional view of a valve mechanism according to a modification of the embodiment.

FIG. 10 shows the spacing L5 between the outer ends (ends located on the outer side in the predetermined direction) of the two open flow passages 32 and the spacing L6 between the P1b port and the R1b port. The relation between the spacing L5 and the spacing L6 can be changed as follows.

Figure 11:
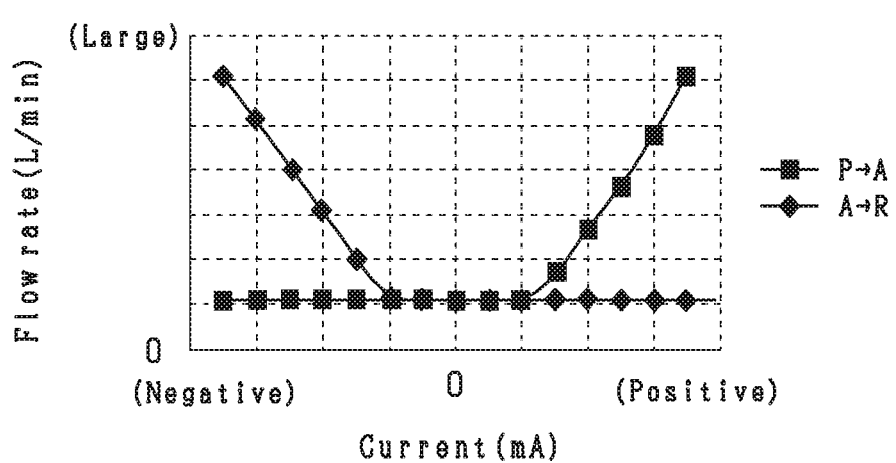
FIG. 11 is a graph showing an exemplary relation between drive current and flow rates.

(1) L6≥L5. In this case, as shown in FIG. 11, the flow passage changeover valve 10 has a dead zone near the point where the current supplied to the drive unit of the valve is 0 mA, and can stabilize the start of flow of the fluid.

Figure 12:
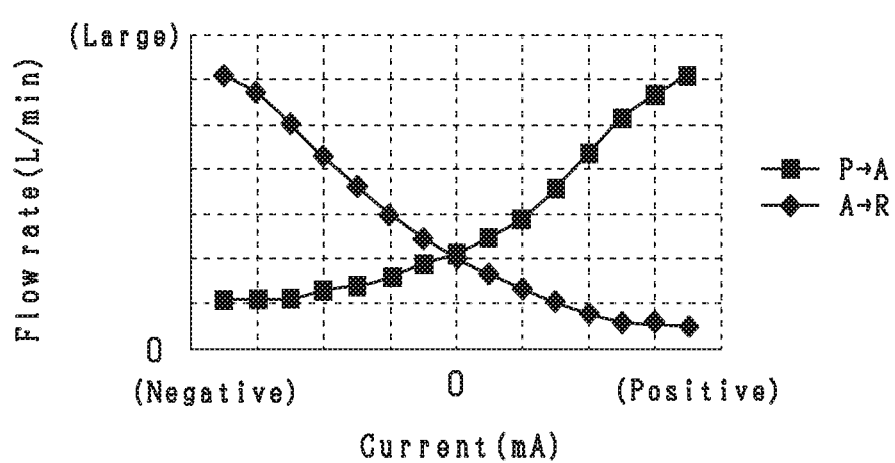
FIG. 12 is a graph showing another exemplary relation between drive current and flow rates.

(2) L6<L5. In this case, as shown in FIG. 12, the flow passage changeover valve 10 provides a constant bleeding flow rate in a zone near the point where the current supplied to the drive unit of the valve is 0 mA, and can enhance responsiveness in changing the flow rate of the fluid.

Figure 13:
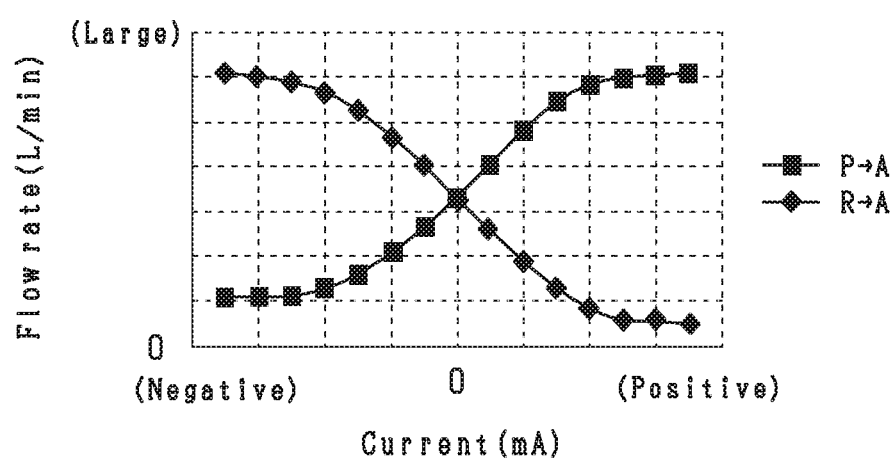
FIG. 13 is a graph showing still another exemplary relation between drive current and flow rates.

(3) L6<<L5. In this case, as shown in FIG. 13, the flow passage changeover valve 10 can be used as a mixing valve for mixing a fluid flowing from the port P to the port A and a fluid flowing from the port R to the port A. Also, the number of the ports formed on each first main body 41A is not limited to three, and may be two, four, or more.

The configurations of the components of the drive unit 70, such as the coil 72, the core 71, the magnets 74A to 75B, may be changed freely so long as the drive unit 70 can drive the valve body 31 (the movable member) in the predetermined direction in a non-contact state by means of electromagnetic force applied to a region between the pair of plate springs 51 in the predetermined direction.

The fluid whose flow passage is switched by the flow passage changeover valve 10 is not limited to air, and may be liquid or gas other than air. The movable element 76 and the valve body 31 may be formed as a single member through use of a paramagnetic material. In this case, the movable element itself serves as the valve body 31 (the movable member), and the open flow passages 32 are formed on the movable element.

The present invention is not limited to the flow passage changeover valve 10 and can be realized as an electromagnetic actuator which has a movable member driven in a predetermined direction. Such an electromagnetic actuator can be obtained by modifying the flow passage changeover valve 10 as follows. The open flow passages 32 are omitted from the valve body 31 so that the valve body 31 serves as a mere movable member. The movable member is extended in the longitudinal direction (the predetermined direction) so as to form a reciprocating output shaft. The flow passages and ports for fluid are omitted from the main bodies and the housing so that the main bodies and the housing serve as mere main bodies and a mere housing which have neither flow passages nor ports. In this case as well, no frictional force is generated when the movable member is driven, whereby responsiveness in driving the movable member can be improved.

What is claimed is:

1. An electromagnetic actuator comprising:
a pair of plate springs, each of which is configured to produce elastic force in a predetermined direction in accordance with an amount of deformation;
a movable member supported by the pair of plate springs to be movable in the predetermined direction;
a movable element fixed to a portion of the movable member, the portion being located between the pair of plate springs; and
a drive unit which is configured to drive the movable member in the predetermined direction in a non-contact state by means of electromagnetic force to be applied to the movable element between the pair of plate springs in the predetermined direction,
wherein the movable member is a valve body having an open flow passage which is opened to a predetermined surface of the valve body over a predetermined length in the predetermined direction,
and wherein the electromagnetic actuator further comprises:
a first main body that has a plurality of ports and a plurality of connection flow passages connected to the plurality of ports, respectively, the plurality of ports being formed on a facing surface of the first main body that faces the predetermined surface of the valve body, the plurality of ports having openings arranged on the facing surface in the predetermined direction at a spacing shorter than the predetermined length.

2. The electromagnetic actuator according to claim 1, further comprising a second main body to which the pair of plate springs are fixed, wherein
the second main body has a first surface that faces the facing surface of the first main body,
the predetermined surface of the valve body is flush with the first surface of the second main body, and
the first main body and the second main body are fixed together in a state in which a shim having a predetermined thickness is inserted between the facing surface of the first main body and the first surface of the second main body.

3. The electromagnetic actuator according to claim 2, wherein each plate spring of the pair of plate springs is fixed to the second main body in a state in which a main face of each plate spring of the pair of plate springs having a largest area extends perpendicularly to the predetermined direction.

4. The electromagnetic actuator according to claim 2, wherein the pair of plate springs support opposite ends of the valve body.

5. The electromagnetic actuator according to claim 3, wherein the pair of plate springs support opposite ends of the valve body.

6. The electromagnetic actuator according to claim 1, wherein the pair of plate springs support opposite ends of the valve body.

7. The electromagnetic actuator according to claim 1, wherein a position of the movable member in a state in which the pair of plate springs support the movable member in a natural state corresponds to a neutral position at which the movable member is located when electromagnetic force for reciprocating the movable member in the predetermined direction is not applied by the drive unit.

* * * * *